(12) United States Patent
Hur

(10) Patent No.: US 11,030,597 B2
(45) Date of Patent: Jun. 8, 2021

(54) METHOD OF MANAGING FRANCHISES USING CREDIT-CARD PAYMENT SYSTEM

(71) Applicant: PARIS CROISSANT CO., LTD., Songnam-shi (KR)

(72) Inventor: Hee Soo Hur, Seoul (KR)

(73) Assignee: PARIS CROISSANT CO., LTD., Songnam-shi (KR)

( * ) Notice: Subject to any disclaimer, the term of this patent is extended or adjusted under 35 U.S.C. 154(b) by 331 days.

(21) Appl. No.: 15/585,104

(22) Filed: May 2, 2017

(65) Prior Publication Data

US 2017/0255914 A1 Sep. 7, 2017

Related U.S. Application Data

(63) Continuation of application No. 12/714,296, filed on Feb. 26, 2010, now abandoned.

(30) Foreign Application Priority Data

Jan. 27, 2010 (KR) .......................... 10-2010-0007604
Feb. 8, 2010 (KR) .......................... 10-2010-0011705

(51) Int. Cl.
*G06Q 20/20* (2012.01)
*G06Q 20/40* (2012.01)
(Continued)

(52) U.S. Cl.
CPC .......... *G06Q 20/20* (2013.01); *G06Q 20/204* (2013.01); *G06Q 20/24* (2013.01); *G06Q 20/382* (2013.01);
(Continued)

(58) Field of Classification Search
CPC combination set(s) only.
See application file for complete search history.

(56) References Cited

U.S. PATENT DOCUMENTS

| 7,287,753 | B1 | 10/2007 | Brigidi | |
| 2002/0128909 | A1* | 9/2002 | Scrivano | G06Q 30/0211 705/14.13 |

(Continued)

FOREIGN PATENT DOCUMENTS

| JP | 2005-276107 A | 10/2005 |
| KR | 10-2009-0106918 A | 10/2009 |

OTHER PUBLICATIONS

White, Ron, "How Computers Work", Millenium Ed., Que Corporation, Indianapolis, IN, 1999.

*Primary Examiner* — Chrystina E Zelaskiewicz
(74) *Attorney, Agent, or Firm* — patenttm.us

(57) ABSTRACT

A method of managing franchises using a credit-card payment system is provided. The method includes (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, requesting a card company for payment approval, and receiving approval information; (d) outputting selection items for a satisfaction survey for service provided by the franchise through a sign pad connected to the franchise client; (e) when customer response data for the survey selection items is received from the sign pad, analyzing and statistically processing customer satisfaction evaluation (Continued)

information for the franchise according to the selection items, and storing the resultant customer satisfaction evaluation information in a database of the customer information server; and (f) switching the sign pad to a screen for obtaining a digital signature.

20 Claims, 7 Drawing Sheets

(51) Int. Cl.
　　　*G06Q 30/02*　　　(2012.01)
　　　*G06Q 20/24*　　　(2012.01)
　　　*G06Q 20/38*　　　(2012.01)
(52) U.S. Cl.
　　　CPC ........... *G06Q 20/387* (2013.01); *G06Q 20/40* (2013.01); *G06Q 30/02* (2013.01); *G06Q 30/0203* (2013.01); *G06Q 30/0218* (2013.01); *G06Q 30/0222* (2013.01); *G06Q 30/0233* (2013.01)

(56) References Cited

U.S. PATENT DOCUMENTS

| | | | |
|---|---|---|---|
| 2004/0143498 A1* | 7/2004 | Umeda | G06Q 30/0217 705/14.1 |
| 2006/0069619 A1* | 3/2006 | Walker | G06Q 30/02 705/14.25 |
| 2009/0192898 A1* | 7/2009 | Baril | G06Q 30/06 705/14.64 |

* cited by examiner

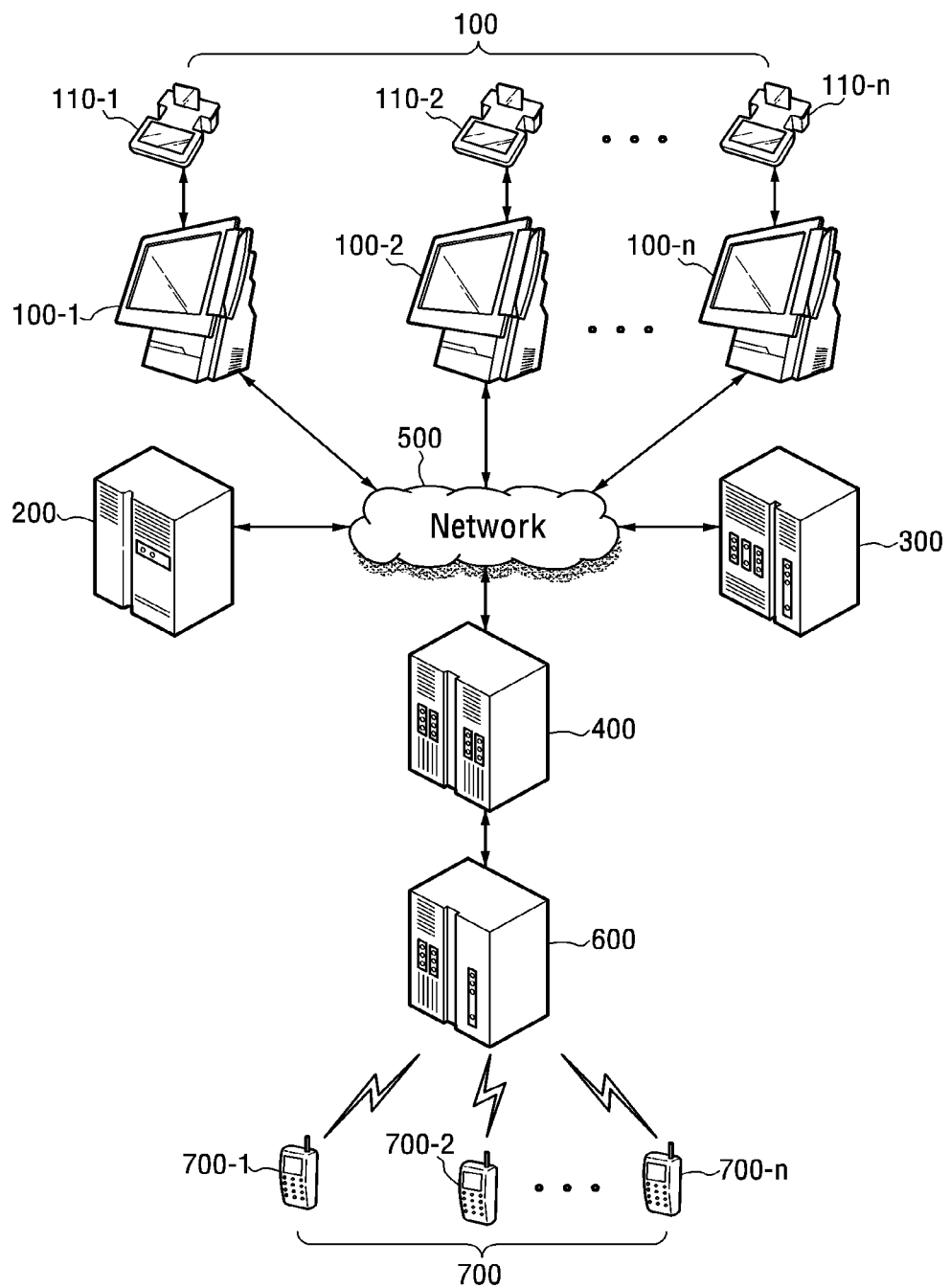
[Fig 1]

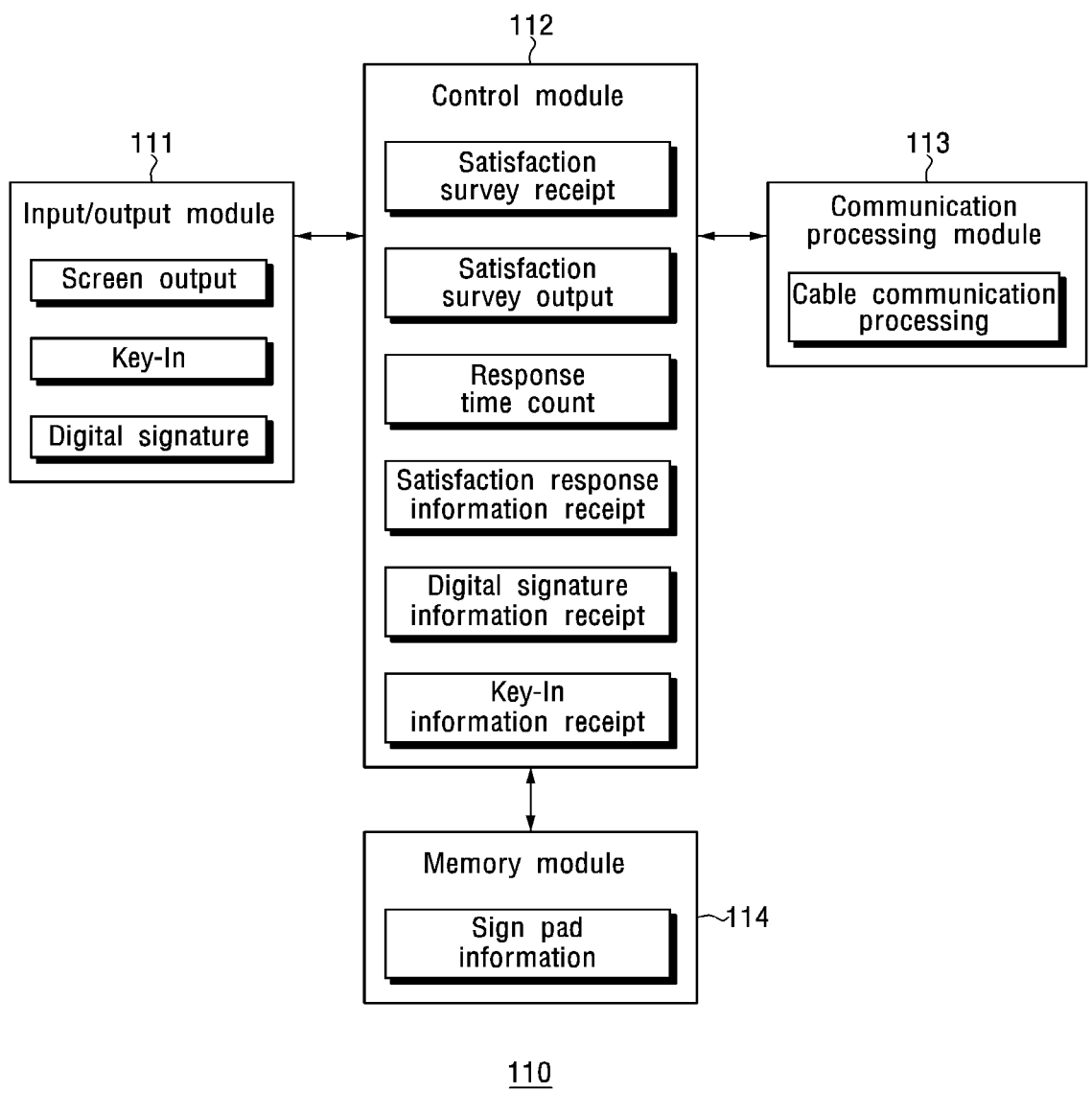

[Fig 4]
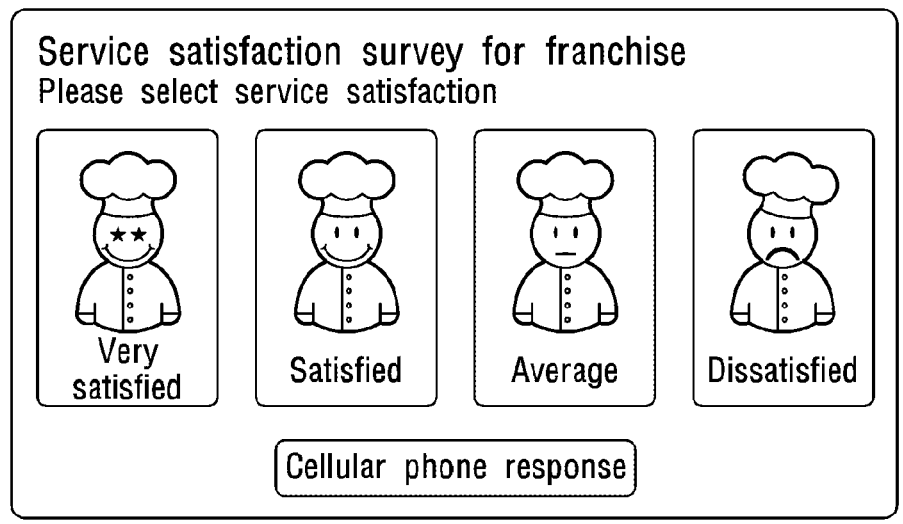
[Fig 3]
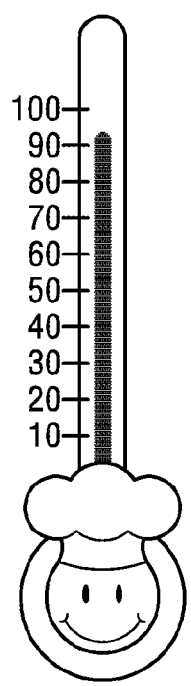

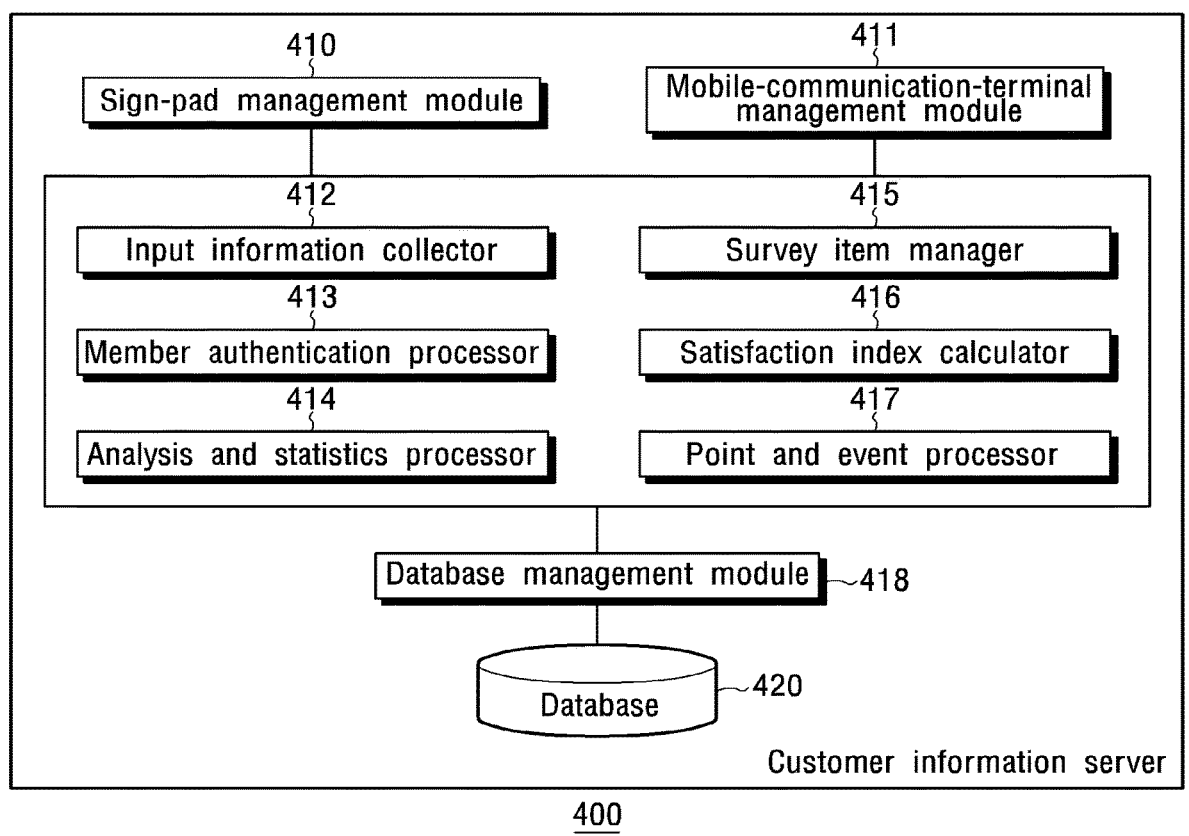

[Fig 6]
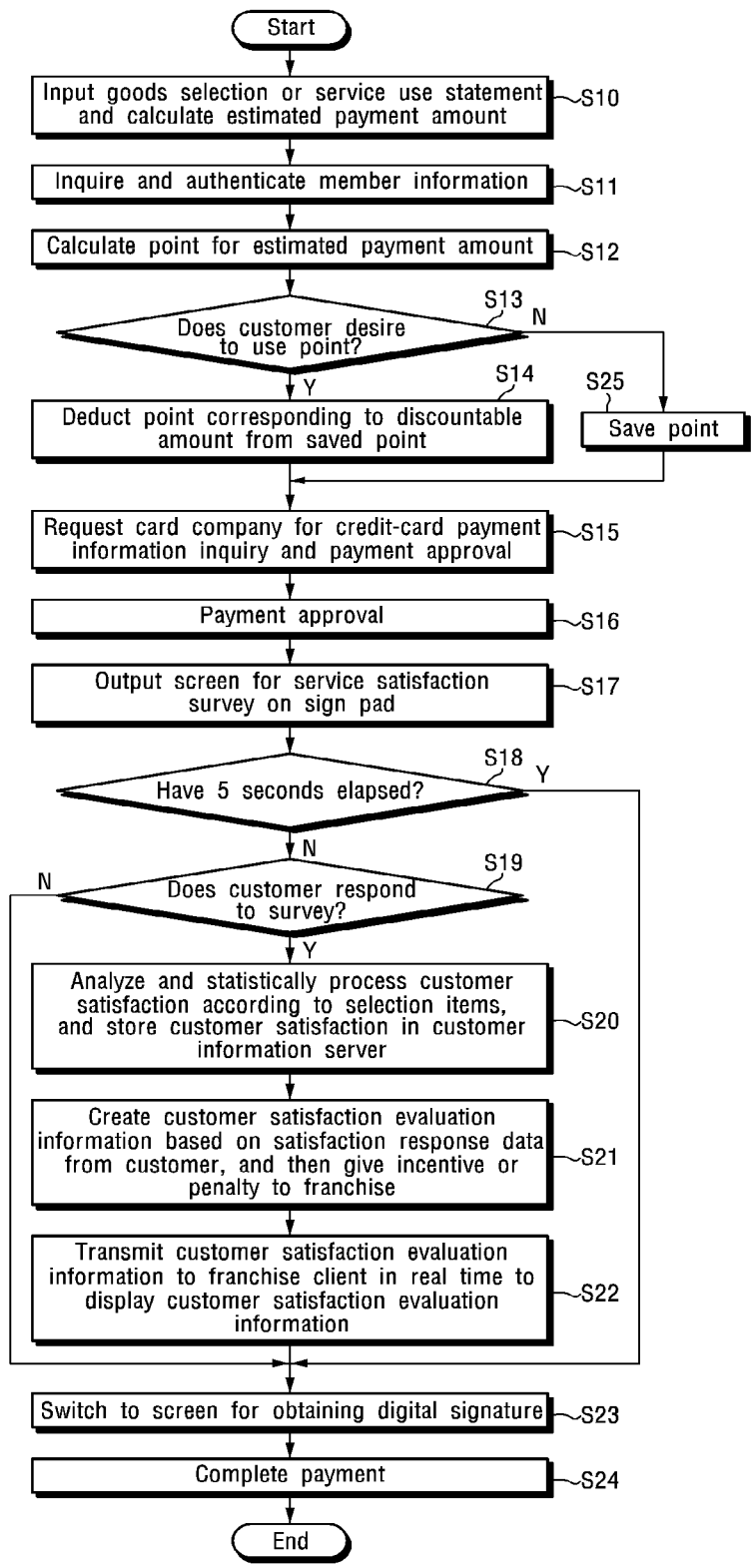

[Fig 7]
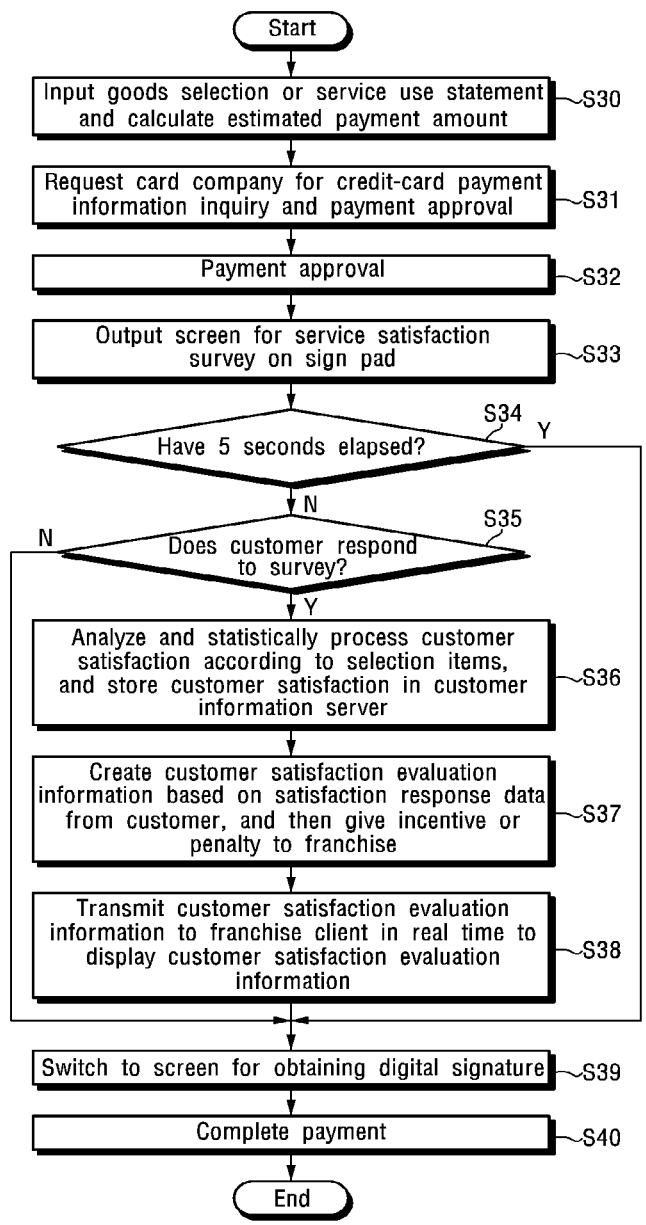

[Fig 8]
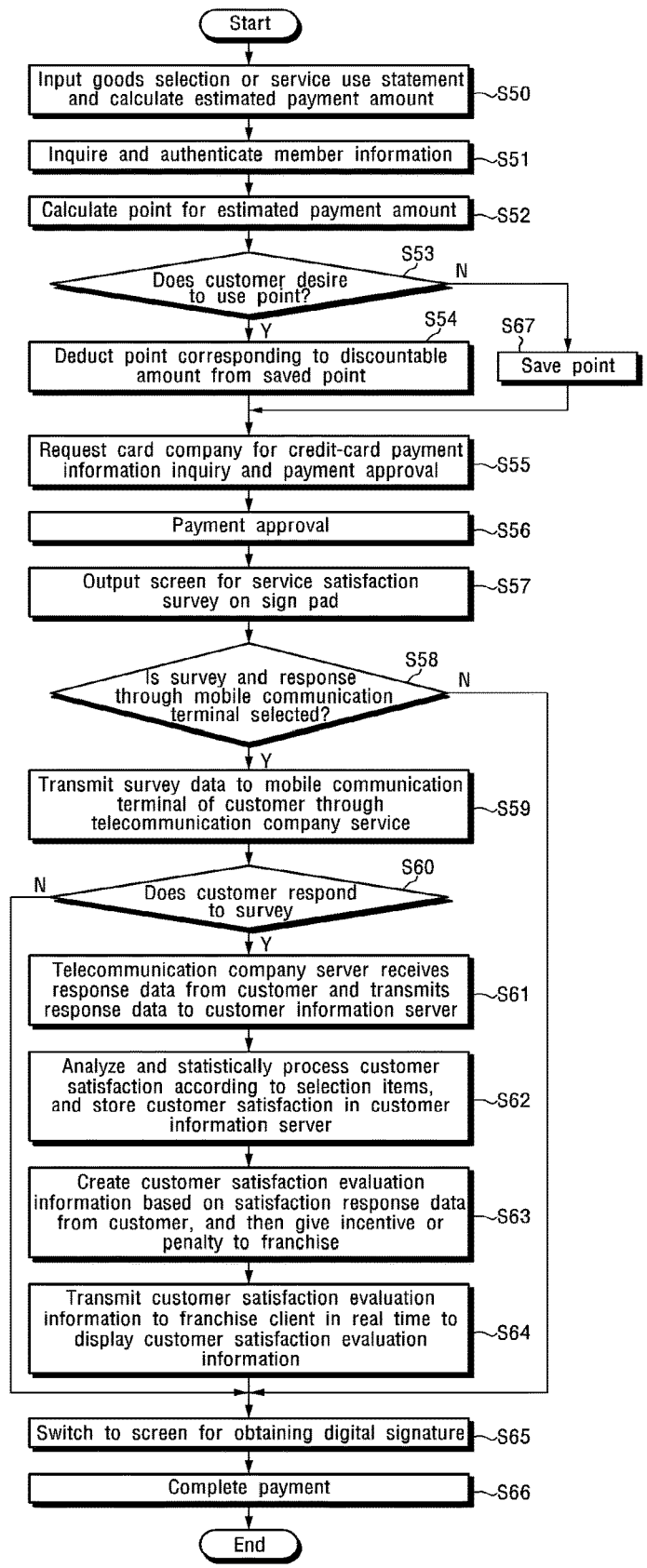

METHOD OF MANAGING FRANCHISES USING CREDIT-CARD PAYMENT SYSTEM

BACKGROUND

1. Field of the Invention

The present invention relates to a method of managing a franchise, and more particularly, to a method of managing franchises using a credit-card payment system that is capable of surveying and analyzing transaction information and customer information of a franchise and customer service satisfaction for the franchise using a credit-card payment system with a sign pad, such that customer and franchise management can be efficiently performed and a business strategy of the franchise can be established and enhanced.

2. Discussion of Related Art

In recent years, as dietary life patterns change and demand for high-quality food increases, a franchise sales approach in which various finished products or semi-finished products are produced in large quantities at a head office and supplied to franchises is widely used in the food industry.

In the franchise sale approach, the head office develops goods, services, know-how, etc. and smoothly distributes and operates a sales system, and the franchise provides a uniform quality of products and services to customers based on goods and systems developed by the head office.

In particular, the head office recognizes customer complaints and improves satisfaction to induce customers to consistently purchase the products or services and manage the customers, such that the franchise can easily accumulate customers and maintain a relationship with the customers.

Meanwhile, with the rapid development of information processing technology and the increase of electronic payment infrastructure, electronic payment systems for paying a price of goods or service through a card medium such as a credit card, a debit card, or a check card, card payment terminals such as a customer activated terminal (CAT) or a point of sales (POS) management terminal, and large payment providers, i.e., a value added network (VAN) company, have been widely used.

That is, when a credit card transaction occurs, a credit card franchise scans a credit card provided by a customer (a credit card user) using a card payment terminal to read information from the credit card, and inputs payment information such as transaction amount and an installment period for the transaction. The card payment terminal accesses a VAN company server for bridging a credit-card company via a public switched telephone network (PSTN) or the Internet, transmits credit card information and a transaction statement information to the VAN company server to request transaction approval, receives an approval number authenticating the transaction approval from the VAN company server, outputs a sales statement, and then obtains a signature for transaction evidence from the customer.

Recently, as a scheme of obtaining a digital signature and managing the digital signature on a computer without using paper and pens is applied to a credit-card payment system for convenience of signature, the credit-card payment terminal includes a digital signature device known as a sign pad for obtaining a signature of a customer.

Such a sign pad has an advantage in that it resolves inconvenience of sales statement management, but is limited in usage and utilization due to its simple function of electronically acquiring and storing customer signature information.

Meanwhile, as a survey based on a mobile communication system and the Internet is widely used with the development of information communication technology, various systems and methods for embodying the survey are known. For example, Korean Patent Laid-open Publication No. 2001-105844 discloses a scheme of transmitting questions for a survey and a corresponding response in a short message form using short message service, and Korean Patent Laid-open Publication No. 2002-38255 discloses a scheme for transmitting questions for a survey and a corresponding response using wireless application protocol (WAP).

However, such schemes cannot be applied only to customers purchasing products or services at a franchise for the survey, and data collected from unspecified individuals for verification of evaluation is not directly associated with a franchise owner providing the services to the customer, such that the owner cannot be particularly motivated. In addition, the survey is not directly performed on purchasing customers on site, which degrades the reliability and accuracy of the survey. Accordingly, high service quality cannot be expected.

In addition, since most customers and franchise owners tend to be reluctant to make a survey and a corresponding response when there is no particular incentive, a response rate and a participation rate are very low, which decreases the objectivity of the data.

Accordingly, it is very difficult for the head office to evaluate customer satisfaction for franchises distributed over regions, such that the conventional schemes are limited in franchise management.

SUMMARY OF THE INVENTION

While researching a method of promoting efficient customer and franchise management and business efficiency by considering all the matters as described above and realistic conditions and using a credit-card payment system, the inventor has confirmed that a marketing strategy of a head office can be established, customers and franchises can be managed, and service for customers can be further enhanced by surveying and analyzing customer satisfaction for franchises through a sign pad or a mobile communication terminal in a credit-card payment process.

The present invention is directed to a method of managing franchises using a credit-card payment system that is capable of surveying and analyzing customer satisfaction for franchises in a credit-card payment process.

The present invention is also directed to a method of managing franchises using a credit-card payment system that is capable of achieving high practicality and objectivity for a franchise satisfaction survey.

The present invention is also directed to a method of managing franchises using a credit-card payment system that is capable of inducing survey participation and securing reliability of the survey, and further enhancing service by reflecting the result of the survey on customer and franchise management.

According to an aspect of the present invention, there is provided a method of managing franchises using a credit-card payment system, including: (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, requesting a card company for payment approval, and receiving approval information; (d) outputting selection items for a satisfaction survey for service provided by the franchise through a sign pad connected to the franchise client; (e) when customer response data for the survey selection items is received from the sign pad, analyzing and statistically processing customer satisfaction evaluation information for the franchise according to the selection items, and storing the resultant customer satisfaction evaluation information in a database of the customer information server; and (f) switching the sign pad to a screen for obtaining a digital signature.

According to another aspect of the present invention, there is provided a method of managing franchises using a credit-card payment system, including: (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, requesting a card company for payment approval, and receiving approval information; (d) outputting selection items for a satisfaction survey for service provided by the franchise through a sign pad connected to the franchise client; (e) when customer response data for the survey selection items is received from the sign pad, analyzing and statistically processing customer satisfaction evaluation information for the franchise according to the selection items, storing the resultant customer satisfaction evaluation information in a database of the customer information server, and saving an additional point in the member information of the customer; and (f) switching the sign pad to a screen for obtaining a digital signature.

According to still another aspect of the present invention, there is provided a method of managing franchises using a credit-card payment system, including: (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, requesting a card company for payment approval, and receiving approval information; (d) outputting selection items for a satisfaction survey for service provided by the franchise through a sign pad connected to the franchise client; (e) when customer response data for the survey selection items is received from the sign pad, analyzing and statistically processing customer satisfaction evaluation information for the franchise according to the selection items, storing the resultant customer satisfaction evaluation information in a database of the customer information server, determining whether the customer wins an event, and storing the result of determination in the member information of the customer; and (f) displaying an indication of whether the customer wins an event on the sign pad during a certain period of time and then switching the sign pad to a screen for obtaining a digital signature.

Step (e) may include converting the customer satisfaction evaluation information into a numerical value and transmitting the numerical value to the franchise client to display the numerical value in real time.

The present invention may further include, between step (e) and step (f), (e-1) calculating an evaluation rating for the franchise based on the customer satisfaction evaluation information, and giving an incentive including franchise point save, return support, gift certificate provision, or free new-product shipment to a good franchise and a penalty including participation in periodic education performed by the head office, order restriction during a certain period of time, or return restriction to a bad franchise according to a policy of the head office.

According to yet another aspect of the present invention, there is provided a method of managing franchises using a credit-card payment system, including: (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, confirming a discountable amount of the estimated payment amount from the customer information server when the customer selects point use, and deducting a point corresponding to the discountable amount from a previously saved point in the member information of the customer; (d) subtracting, by the franchise client, an amount corresponding to the deducted point from the estimated payment amount to re-calculate an estimated payment amount, requesting a card company for payment approval, and receiving approval information; (e) outputting selection items for service satisfaction for the franchise through a sign pad connected to the franchise client; (f) when customer response data for the survey selection items is received from the sign pad, analyzing and statistically processing customer satisfaction evaluation information for the franchise according to the selection items, and storing the resultant customer satisfaction evaluation information in a database of the customer information server; and (g) switching the sign pad to a screen for obtaining a digital signature.

According to yet another aspect of the present invention, there is provided a method of managing franchises using a credit-card payment system, including: (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, confirming a discountable amount of the estimated payment amount from the customer information server when the customer selects point use, and deducting a point corresponding to the discountable amount from a previously saved point in the member information of the customer; (d) subtracting, by the franchise client, an amount corresponding to the deducted point from the estimated payment amount to re-calculate an estimated payment amount, requesting a card company for payment approval, and receiving approval information; (e) outputting selection items for service satisfaction for the franchise through a sign pad connected to the franchise client; (f) when customer response data for the survey selection items is received from the sign pad, analyzing and statistically processing customer satisfaction evaluation information for the franchise according to the selection items, storing the resultant customer satisfaction evaluation information in a database of the customer information server, and saving an additional point in the member information of the customer; and (g) switching the sign pad to a screen for obtaining a digital signature.

According to yet another aspect of the present invention, there is provided a method of managing franchises using a credit-card payment system, including: (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, confirming a discountable amount of the estimated payment amount from the customer information server when the customer selects point use, and deducting a point corresponding to the discountable amount from a previously saved point in the member information of the customer; (d) subtracting, by the franchise client, an amount corresponding to the deducted point from the estimated payment amount to re-calculate an estimated payment amount, requesting a card company for payment approval, and receiving approval information; (e) outputting selection items for service satisfaction for the franchise through a sign pad connected to the franchise client; (f) when customer response data for the survey selection items is received from the sign pad, analyzing and statistically processing customer satisfaction evaluation information for the franchise according to the selection items, storing the resultant customer satisfaction evaluation information in a database of the customer information server, determining whether the customer wins an event, and storing the result of determination in the member information of the customer; and (g) displaying an indication of whether the customer wins an event on the sign pad during a certain period of time and then switching the sign pad to a screen for obtaining a digital signature.

Step (f) may include converting the customer satisfaction evaluation information into a numerical value and transmitting the numerical value to the franchise client to display the numerical value in real time.

According to yet another aspect of the present invention, there is provided a method of managing franchises using a credit-card payment system, including: (a) inputting credit-card payment information for a goods selection or service use statement of a customer at a franchise to a franchise client, requesting a card company for payment approval, and receiving approval information; (b) outputting selection items for service satisfaction for the franchise through a sign pad connected to the franchise client; (c) when customer response data for the survey selection items is received from the sign pad, analyzing and statistically processing customer satisfaction evaluation information for the franchise according to the selection items, and storing the resultant customer satisfaction evaluation information in a database of the customer information server of the head office; and (d) switching the sign pad to a screen for obtaining a digital signature.

According to yet another aspect of the present invention, there is provided a method of managing franchises using a credit-card payment system, including: (a) inputting credit-card payment information for a goods selection or service use statement of a customer at a franchise to a franchise client, requesting a card company for payment approval, and receiving approval information; (b) outputting selection items for service satisfaction for the franchise through a sign pad connected to the franchise client; (c) when customer response data for the survey selection items is received from the sign pad, analyzing and statistically processing customer satisfaction evaluation information for the franchise according to the selection items, storing the resultant customer satisfaction evaluation information in a database of a customer information server of a head office, and determining whether the customer wins an event; and (d) displaying an indication of whether the customer wins an event on the sign pad during a certain period of time and then switching the sign pad to a screen for obtaining a digital signature.

Step (c) may include converting the customer satisfaction evaluation information into a numerical value and transmitting the numerical value to the franchise client to display the numerical value in real time.

The present invention may include, between step (c) and step (d), (c-1) calculating an evaluation rating for the franchise based on the customer satisfaction evaluation information, and giving an incentive including franchise point save, return support, gift certificate provision, or free new-product shipment to a good franchise and a penalty including participation in periodic education performed by the head office, order restriction during a certain period of time, or return restriction to a bad franchise according to a policy of the head office.

According to yet another aspect of the present invention, there is provided a method of managing franchises using a credit-card payment system, including: (a) inputting credit-card payment information for a goods selection or service use statement of a customer at a franchise to a franchise client, confirming a discountable amount of an estimated payment amount from a customer information server of a head office when the customer selects point use, and deducting a point corresponding to the discountable amount from a previously saved point in member information of the customer; (b) subtracting, by the franchise client, an amount corresponding to the deducted point from the estimated payment amount to re-calculate an estimated payment amount, requesting a card company for payment approval, and receiving approval information; (c) outputting selection items for service satisfaction for the franchise through a sign pad connected to the franchise client; (d) when customer response data for the survey selection items is received from the sign pad, analyzing and statistically processing customer satisfaction evaluation information for the franchise according to the selection items, and storing the resultant customer satisfaction evaluation information in a database of the customer information server; and (e) switching the sign pad to a screen for obtaining a digital signature.

According to yet another aspect of the present invention, there is provided a method of managing franchises using a credit-card payment system, including: (a) inputting credit-card payment information for a goods selection or service use statement of a customer at a franchise to a franchise client, confirming a discountable amount of an estimated payment amount from a customer information server of a head office when the customer selects point use, and deducting a point corresponding to the discountable amount from a previously saved point in member information of the customer; (b) subtracting, by the franchise client, an amount corresponding to the deducted point from the estimated payment amount to re-calculate an estimated payment amount, requesting a card company for payment approval, and receiving approval information; (c) outputting selection items for service satisfaction for the franchise through a sign pad connected to the franchise client; (d) when customer response data for the survey selection items is received from the sign pad, analyzing and statistically processing customer satisfaction evaluation information for the franchise according to the selection items, storing the resultant customer satisfaction evaluation information in a database of the customer information server, and determining whether the customer wins an event; and (e) displaying an indication of whether the customer wins an event on the sign pad during a certain period of time and then switching the sign pad to a screen for obtaining a digital signature.

Step (d) may include converting the customer satisfaction evaluation information into a numerical value and transmitting the numerical value to the franchise client to display the numerical value in real time.

The present invention may further include, between step (d) and step (e), (d-1) calculating an evaluation rating for the franchise based on the customer satisfaction evaluation information, and giving an incentive including franchise point save, return support, gift certificate provision, or free new-product shipment to a good franchise and a penalty including participation in periodic education performed by the head office, order restriction during a certain period of time, or return restriction to a bad franchise according to a policy of the head office.

According to yet another aspect of the present invention, there is provided a method of managing franchises using a credit-card payment system, including: (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, requesting a card company for payment approval, and receiving approval information; (d) outputting selection items for a satisfaction survey for service provided by the franchise through a sign pad connected to the franchise client and asking whether the customer desires to receive survey content through a mobile communication terminal of the customer; (e) when a selection input for the customer to receive the survey content through the mobile communication terminal is received from the sign pad, transmitting, by the customer information server, the selection items for a satisfaction survey for service provided by the franchise to the mobile communication terminal of the customer through telecommunication company service based on the member information of the customer; (f) receiving, by a telecommunication company server, customer response data for the survey selection items from the mobile communication terminal of the customer and transmitting the customer response data to the customer information server; (g) analyzing and statistically processing, by the customer information server, customer satisfaction evaluation information for the franchise, and storing the resultant customer satisfaction evaluation information in a database; and (h) switching the sign pad to a screen for obtaining a digital signature.

According to yet another aspect of the present invention, there is provided a method of managing franchises using a credit-card payment system, including: (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, requesting a card company for payment approval, and receiving approval information; (d) outputting selection items for a satisfaction survey for service provided by the franchise through a sign pad connected to the franchise client and asking whether the customer desires to receive survey content through a mobile communication terminal of the customer; (e) when a selection input for the customer to receive the survey content through the mobile communication terminal is received from the sign pad, transmitting, by the customer information server, the selection items for a satisfaction survey for service provided by the franchise to the mobile communication terminal of the customer through telecommunication company service based on the member information of the customer; (f) receiving, by a telecommunication company server, customer response data for the survey selection items from the mobile communication terminal of the customer and transmitting the customer response data to the customer information server; (g) analyzing and statistically processing, by the customer information server, customer satisfaction evaluation information for the franchise, storing the resultant customer satisfaction evaluation information in a database, and saving an additional point in the member information of the customer; and (h) switching the sign pad to a screen for obtaining a digital signature.

According to yet another aspect of the present invention, there is provided a method of managing franchises using a credit-card payment system, including: (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, requesting a card company for payment approval, and receiving approval information; (d) outputting selection items for a satisfaction survey for service provided by the franchise through a sign pad connected to the franchise client and asking whether the customer desires to receive survey content through a mobile communication terminal of the customer; (e) when a selection input for the customer to receive the survey content through the mobile communication terminal is received from the sign pad, transmitting, by the customer information server, the selection items for a satisfaction survey for service provided by the franchise to the mobile communication terminal of the customer through telecommunication company service based on the member information of the customer; (f) receiving, by a telecommunication company server, customer response data for the survey selection items from the mobile communication terminal of the customer and transmitting the customer response data to the customer information server; (g) analyzing and statistically processing, by the customer information server, customer satisfaction evaluation information for the franchise, storing the resultant customer satisfaction evaluation information in a database, determining whether the customer wins an event, and storing the result of determination in the member information of the customer; and (h) displaying an indication of whether the customer wins an event on the sign pad during a certain period of time and then switching the sign pad to a screen for obtaining a digital signature.

Step (g) may include converting the customer satisfaction evaluation information into a numerical value and transmitting the numerical value to the franchise client to display the numerical value in real time.

The present invention may include, between step (g) and step (h), (g-1) calculating an evaluation rating for the franchise based on the customer satisfaction evaluation information, and giving an incentive including franchise point save, return support, gift certificate provision, or free new-product shipment to a good franchise and a penalty including participation in periodic education performed by the head office, order restriction during a certain period of time, or return restriction to a bad franchise according to a policy of the head office.

The present invention may include, between step (b) and step (c), (b-1) calculating, by the franchise client, a point in a predetermination ratio of the estimated payment amount, and saving and storing the point in the member information of the customer in the customer information server.

According to yet another aspect of the present invention, there is provided a method of managing franchises using a credit-card payment system, including: (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, confirming a discountable amount of the estimated payment amount from the customer information server when the customer selects point use, and deducting a point corresponding to the discountable amount from a previously saved point in the member information of the customer; (d) subtracting, by the franchise client, an amount corresponding to the deducted point from the estimated payment amount to re-calculate an estimated payment amount, requesting a card company for payment approval, and receiving approval information; (e) outputting selection items for a satisfaction survey for service provided by the franchise through a sign pad connected to the franchise client and asking whether the customer desires to receive survey content through a mobile communication terminal of the customer; (f) when a selection input for the customer to receive the survey content through the mobile communication terminal is received from the sign pad, transmitting, by the customer information server, the selection items for a satisfaction survey for service provided by the franchise to the mobile communication terminal of the customer through telecommunication company service based on the member information of the customer; (g) receiving, by a telecommunication company server, customer response data for the survey selection items from the mobile communication terminal of the customer and transmitting the customer response data to the customer information server; (h) analyzing and statistically processing, by the customer information server, customer satisfaction evaluation information for the franchise, and storing the resultant customer satisfaction evaluation information in a database; and (i) switching the sign pad to a screen for obtaining a digital signature.

According to yet another aspect of the present invention, there is provided a method of managing franchises using a credit-card payment system, including: (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, confirming a discountable amount of the estimated payment amount from the customer information server when the customer selects point use, and deducting a point corresponding to the discountable amount from a previously saved point in the member information of the customer; (d) subtracting, by the franchise client, an amount corresponding to the deducted point from the estimated payment amount to re-calculate an estimated payment amount, requesting a card company for payment approval, and receiving approval information; (e) outputting selection items for a satisfaction survey for service provided by the franchise through a sign pad connected to the franchise client and asking whether the customer desires to receive survey content through a mobile communication terminal of the customer; (f) when a selection input for the customer to receive the survey content through the mobile communication terminal is received from the sign pad, transmitting, by the customer information server, the selection items for a satisfaction survey for service provided by the franchise to the mobile communication terminal of the customer through telecommunication company service based on the member information of the customer; (g) receiving, by a telecommunication company server, customer response data for the survey selection items from the mobile communication terminal of the customer and transmitting the customer response data to the customer information server; (h) analyzing and statistically processing, by the customer information server, customer satisfaction evaluation information for the franchise, storing the resultant customer satisfaction evaluation information in a database, and saving an additional point in the member information of the customer; and (i) switching the sign pad to a screen for obtaining a digital signature.

According to yet another aspect of the present invention, there is provided a method of managing franchises using a credit-card payment system, including: (a) inputting a goods selection or service use statement of a customer at a franchise to a franchise client to calculate an estimated payment amount, inputting member information of the customer to the franchise client, and transmitting the member information to a customer information server of a head office to request member authentication; (b) receiving, by the customer information server, a member authentication request signal for the customer, comparing the member authentication request signal with previously stored member information of the customer to perform authentication processing, and transmitting the result of authentication processing to the franchise client; (c) inputting credit-card payment information for the estimated payment amount to the franchise client, confirming a discountable amount of the estimated payment amount from the customer information server when the customer selects point use, and deducting a point corresponding to the discountable amount from a previously saved point in the member information of the customer; (d) subtracting, by the franchise client, an amount corresponding to the deducted point from the estimated payment amount to re-calculate an estimated payment amount, requesting a card company for payment approval, and receiving approval information; (e) outputting selection items for a satisfaction survey for service provided by the franchise through a sign pad connected to the franchise client and asking whether the customer desires to receive survey content through a mobile communication terminal of the customer; (f) when a selection input for the customer to receive the survey content through the mobile communication terminal is received from the sign pad, transmitting, by the customer information server, the selection items for a satisfaction survey for service provided by the franchise to the mobile communication terminal of the customer through telecommunication company service based on the member information of the customer; (g) receiving, by a telecommunication company server, customer response data for the survey selection items from the mobile communication terminal of the customer and transmitting the customer response data to the customer information server; (h) analyzing and statistically processing, by the customer information server, customer satisfaction evaluation information for the franchise, storing the resultant customer satisfaction evaluation information in a database, determining whether the customer wins an event, and storing the result of determination in the member information of the customer; and (i) displaying an indication of whether the customer wins an event on the sign pad during a certain period of time and then switching the sign pad to a screen for obtaining a digital signature.

Step (h) may include converting the customer satisfaction evaluation information into a numerical value and transmitting the numerical value to the franchise client to display the numerical value in real time.

The present invention may further include, between step (h) and step (i), (h-1) calculating an evaluation rating for the franchise based on the customer satisfaction evaluation information, and giving an incentive including franchise point save, return support, gift certificate provision, or free new-product shipment to a good franchise and a penalty including participation in periodic education performed by the head office, order restriction during a certain period of time, or return restriction to a bad franchise according to a policy of the head office.

Step (a) may include inputting the use statement of goods using a bar code or a unique number of goods that the customer desires to purchase, and inputting the member information of the customer using a membership card provided by the customer or any one of a member registration number, a resident registration number, or a telephone number of the customer.

The franchise client and the customer information server may include a point of sales management (POS) system.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 illustrates a configuration of a network to which a credit-card payment system according to the present invention is applied;

FIG. 2 is a block diagram of a sign pad in the credit-card payment system according to the present invention;

FIG. 3 illustrates a screen for a franchise client connected to the credit-card payment system according to the present invention;

FIG. 4 illustrates a screen for a sign pad in the credit-card payment system according to the present invention;

FIG. 5 is a block diagram of a customer information server connected to the credit-card payment system according to the present invention;

FIGS. 6 and 7 are flowcharts illustrating a method of managing franchises using a credit-card payment system according to a first exemplary embodiment of the present invention; and FIG. 8 is a flowchart illustrating a method of managing franchises using a credit-card payment system according to a second exemplary embodiment of the present invention.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Terminologies used in the description of the present invention are defined by considering functions in the present invention and should be construed as having a concept according to the present invention and a meaning widely used in a technical field.

A detailed description of the present invention and related known functions or configurations incorporated herein will be omitted when it obscures the subject matter of the present invention.

FIG. 1 illustrates a configuration of a network to which a credit-card payment system according to the present invention is applied, and FIG. 2 is a block diagram of a sign pad in the credit-card payment system according to the present invention.

Referring to FIG. 1, the credit-card payment system according to the present invention includes a franchise client 100, a VAN company server 200, a credit-card company server 300, a customer information server 400, a telecommunication company server 600, and a mobile communication terminal 700.

First, the franchise client 100 is disposed at a franchise and includes a sign pad 110 for obtaining a signature of a credit card user as an electrical signal and displaying the signature as an image. The franchise client 100 further includes an EMV (contact: IC, contactless: RF), a card reader (MSR), etc. for payment and payment processing (receipt issuing), so that any type of credit payment can be performed.

The franchise client 100 is assigned a unique number such as a serial number. The unique number together with survey data received from the customer is transmitted from the sign pad 110 to the customer information server 400, so that a region at which the franchise is located can be identified by the unique number.

In addition, the franchise client 100 obtains a numerical value of customer satisfaction evaluation information and analysis content, and displays it in real time, as shown in FIG. 3.

Referring to FIG. 2, the sign pad 110 includes an input/output module 111, a control module 112, a communication processing module 113, and a memory module 114.

The input/output module 111 outputs an images for courtesy or satisfaction survey for franchises, a signature request image, or images stored in the memory module 114 to a credit card user upon successful transaction approval or successful payment completion.

In the sign pad 110, the input/output module 111 includes a display unit for outputting an image or text, which may be implemented by, for example, a LCD.

The control module 112 compresses and encrypts content input by the input/output module 111 when the content is transmitted to the communication processing module 113 and the memory module 114.

The control module 112 has survey information for service satisfaction for franchises, and outputs survey items through the input/output module 111.

Here, the survey items may be classified into very satisfied, satisfied, average, dissatisfied, cellular phone response, etc. and be output, as shown in FIG. 4. However, it is understood that the survey items are not limited thereto, but may be variously classified into cleanliness of the franchise, greetings, demeanor and attitude of employees, etc.

The communication processing module 113 is connected to the franchise client 100 via a network, a cable, or a wireless local area communication.

The memory module 114 stores all information for the sign pad, such as various images or sounds.

Accordingly, when the credit-card company server 300 approves payment in response to a payment request from the franchise client 100, a customer signature input by the input/output module 111 of the sign pad 110 is compressed and encrypted by the control module 112 and transmitted to the franchise client 100 via the communication processing module 113.

Meanwhile, the franchise client 100 may be a terminal including a reader for reading card information, such as an inquiry terminal or a point of sale (POS) terminal for credit card approval. That is, the franchise client 100 may be a terminal having a credit approval or cash receipt issue function using card information of a credit card, or a POS terminal having an article management function, as well as the credit approval or cash receipt issue function.

The franchise client 100 reads card information stored in a membership card and a credit card provided by the customer, e.g., a card type, a card number and expiration date, etc. through a reader, and inputs an estimated payment amount and a point dependent on the estimated payment amount.

The franchise client 100 receives a use statement of goods or service that the customer desires to purchase, and member information of the customer. When the customer does not possess a membership card, the franchise client 100 may receive a member registration number given upon issue of a membership card, or a resident registration number or a telephone number of the customer.

Here, price of goods, service use statement, etc. may be automatically input by a scanner or manually directly input by a franchise owner, an employee, or cashier. In particular, goods information may be obtained through a bar code or a unique number of the goods.

Payment information including credit card information and member information read by the franchise client 100 and a payment amount input at the franchise client 100 are transmitted to the credit-card company server 300 via a value added network (VAN) company server 200 using a wired/wireless modem and the network 500, such as a PSTN or the Internet, or to the customer information server 400 of the head office via the network 500.

The VAN company server 200 checks a type of card based on the card information in the credit-card payment information transmitted from the franchise client 100 to identify a credit-card company, and requests a credit-card company server 300 for payment approval via a packet communication network such as X.25 or via the network 500.

The credit-card company server 300 includes a credit information database for storing credit information consisting of member information of registered members, and card numbers and passwords of issued cards, and a payment statement database for storing a payment statement. The credit-card company server 300 approves or declines the payment through a predetermined procedure in response to payment inquiry from the VAN company server 200.

The customer information server 400 is connected to a plurality of franchise clients 100-1, 100-2, . . . , 100-n via the network 500 for collecting survey data from customers, storing the survey data in a database, and analyzing the survey data.

The customer information server 400 manages franchises and customers of the franchises as members, and includes a database 420 for storing various items of information, including member information for member management such as point save, promotional gift presentation, event, etc., franchise information for franchise management such as business-related special treatments or incentive, a penalty statement, an education participation rate, a return rate, and contract content, various survey contents including customer satisfaction for stores or services displayed on the sign pad 110, survey information for period management, and criteria for operating the survey.

Here, the customer information server 400 may be managed based on the franchise client 100 and a POS system for broad and efficient customer and franchise management.

FIG. 5 is a block diagram of a customer information server connected to the credit-card payment system according to the present invention.

Referring to FIG. 5, a customer information server 400 includes a sign-pad management module 410, a mobile-communication-terminal management module 411, an input information collector 412, a member authentication processor 413, an analysis and statistics processor 414, a survey item manager 415, a satisfaction index calculator 416, a point and event processor 417, a database management module 418, and a database 420.

The sign-pad management module 410 performs data communication with the plurality of franchise clients 100-1, 100-2, . . . , 100-n to transmit survey data and receive corresponding response data from customers, and manages the franchise clients 100-1, 100-2, . . . , 100-n. The sign-pad management module 410 performs update processing for transmitting the survey data to sign pads 110-1, 110-2, . . . , 110-n, and transmits data such as a statistical analysis result and a calculated customer satisfaction index from the customer information server 400 to the franchise clients 100-1, 100-2, . . . , 100-n.

The mobile-communication-terminal management module 411 requests the telecommunication company server 600 to transmit survey content to customers authenticated by the member authentication processor 413, i.e., authenticated members using telephone numbers included in the member information.

The input information collector 412 collects response data received via the sign-pad management module 410 or the mobile-communication-terminal management module 411, classifies the response data according to franchise clients disposed at several regions, and stores the response data.

Here, the data collected by the input information collector 412 are classified according to regions, franchises, and both, based on unique numbers allocated to the respective franchise clients. The data may include member information data for identifying the customers and may be response data from the customer responding to one or more survey items.

The member authentication processor 413 determines whether a customer is a member or a customer duplicately responding to the survey based on the member information data collected by the input information collector 412. When the customer is not a member, the member authentication processor 413 induces the customer to be a member, and when the customer is a customer duplicately responding to the survey, the member authentication processor 413 excludes the customer.

For high reliability and objectivity of survey analysis, the member authentication processor 413 may allow the data to be used for analysis only when the customer is authenticated as a member based on the member information input via the franchise client 100, and may store a survey response number according to a customer, a date, and a time zone for franchises.

The analysis and statistics processor 414 separates data authenticated by the member authentication processor 413 and data not authenticated by the member authentication processor 413 from the survey data collected by the input information collector 412, stores the data in a database according to items, and analyzes and statistically processes the response data according to the items and information to create customer satisfaction evaluation information. For example, the analysis and statistics processor 414 may analyze the response data and perform classification according to a region, a franchise, and a sex and age of customers on the whole or based on a unique number for statistical calculation.

The survey item manager 415 provides various types of surveys according to a goods purchase and service use statement for customers, and provides content-type surveys dependent on an event, a season, etc. for particular customers when a predetermined period has lapsed since the particular customers are managed. In this case, content of the survey may include a message explaining brief survey content to customers and requesting the customers to respond to the survey, and an announcement that a point will be saved or a free gift will be provided through a prize drawing for customers responding to the survey.

The survey may also include a menu "Respond To Survey." When a customer selects a specific item and then presses a transfer button, a response to the survey is automatically transmitted.

It is understood that question items for a customer satisfaction survey may be stored by the survey item manager 415 or the question items may not be separately stored but included in the survey content, and the question items may be variously changed with a period, an event, or a season.

The satisfaction index calculator 416 calculates a satisfaction index for each franchise based on the analysis result from the analysis and statistics processor 414. That is, the satisfaction index calculator 416 may convert customer satisfaction or dissatisfaction for franchises providing goods and service into a numerical value, such as a percentage or a score.

The point and event processor 417 saves a point and provides an event only for a customer responding to the survey, determines whether the customer wins the event through a prize drawing, and transmits an indication of the saved point and the drawing result. That is, the point and event processor 417 may provide a point as a predetermined percentage of price of goods purchased by the customer, provide a different additional point according to a survey response and participation number, and provide a coupon having a coupon number written to a receipt output upon credit-card payment, a gift certificate, electronic money, etc. or an incentive such as an additional point to a customer winning an event, such that the customer can be induced to more positively respond to and participate in the survey.

When a survey response number calculated in real time by the member authentication processor 413 reaches a predetermined level, the point and event processor 417 may determine the customer as a winner.

The point and event processor 417 may also store special-treatment and incentive information for each franchise in cooperation with the satisfaction index calculator 416.

The database management module 418 accesses, changes, and deletes data in the database 420 and maintains and manages the database 420 for storing member and franchise information. Also, the database management module 418 stores the information from the analysis and statistics processor 414 in the database 420.

The database 420 stores various pieces of data processed by the customer information server 400.

Meanwhile, the customer information server 400 may allow a system manager to easily perform maintenance, monitor analysis and input/output performed by the customer information server 400 in real time, and input new survey data, using a manager terminal (not shown) separately connected to the customer information server 400.

The telecommunication company server 600 receives customer satisfaction survey data from the customer information server 400, immediately transmits the survey data to the mobile communication terminal 700 of the customer according to a previously set script, receives response data from the mobile communication terminal 700, and delivers the response data to the customer information server 400. In this case, the customer information server 400 receives the customer response data for the satisfaction survey through telecommunication company service, and analyzes, statistically processes and stores the response data.

Here, the telecommunication company server 600 charges the customer information server 400 for a data use fee for the survey response of the customer through the mobile communication terminal 700, and receives the use fee from the head office, which manages the customer information server 400, such that free service can be provided to the customer to increase survey response and participation rates.

The mobile communication terminal 700 is connected to the telecommunication company server 600 via a mobile communication network or a wireless Internet. The mobile communication terminal 700 receives the customer satisfaction survey data and returns a response to the customer satisfaction survey. That is, in order to receive an opinion from the customer, the mobile communication terminals 700-1, 700-2, . . . , 700-n used by customers of the franchise output the survey data transmitted from the customer information server 400 through the telecommunication company service, receive a customer response, and transmit the customer response to the customer information server 400 through the telecommunication company service.

Here, short message service (SMS) mainly providing text messages and multimedia message service (MMS) providing multimedia messages containing photographs, sound, and/or moving-images may be used for the customer satisfaction survey data, and examples of the mobile communication terminal 700 capable of receiving such services include a cellular phone, a personal digital assistant (PDA), etc.

Also, the customer can download survey content or receive the survey content in a streaming form in real time via the mobile communication terminal 700. After executing the survey content, the customer may input and transmit response data to the survey items by using a button of the mobile communication terminal 700.

FIG. 6 is a flowchart illustrating a method of managing franchises using a credit-card payment system according to a first exemplary embodiment of the present invention, in which a customer provides a membership card or indicates a member registration number, a resident registration number, or a telephone number.

Referring to FIG. 6, when a customer selects goods and/or uses service and then provides a membership card or indicates member information, such as member registration number, a resident registration number or a telephone number, an employee or a cashier of a franchise inputs a goods or service use statement to the franchise client 100 to calculate an estimated payment amount, and inputs member information of the customer to the franchise client 100 using, for example, a reader (S10).

The franchise client 100 then transmits the member information, such as the member registration number, the resident registration number, or the telephone number, obtained by reading the membership card or the input the member information to the customer information server 400 of the head office to request inquiry and member authentication. The customer information server 400 compares a member authentication request signal for the customer with previously stored member information of the customer to perform authentication processing and transmits the result of authentication processing to the franchise client 100 (S11).

When the customer information server 400 authenticates the member, the franchise client 100 calculates a point as a predetermined percentage of the estimated payment amount (S12).

The franchise client 100 then confirms whether there is an available point from the member information of the customer, and determines whether the customer desires to use the available point for payment (S13).

When it is determined that the customer selects and requests point use, the franchise client 100 confirms a discountable amount of the estimated payment amount from the customer information server 400, deducts a point corresponding to the discountable amount from the saved point in the member information of the customer, transmits a payment statement including a deduction statement to the franchise client 100, and stores the payment statement in the database 420 of the customer information server 400 (S14). On the other hand, when there is no available point in the member information of the customer, the customer information server 400 transmits a message indicating that a discount benefit is unavailable, to the franchise client 100, and saves a new point (S25).

The franchise client 100 then subtracts an amount corresponding to the deducted point from the estimated payment amount to re-calculate an estimated payment amount, receives credit-card payment information, requests the card company for credit-card payment information inquiry and payment approval via the VAN company server 200 (S15), and receives payment approval from the credit-card company server 300 via the VAN company server 200 (S16).

The franchise client 100 then outputs a selection item screen or image for a satisfaction survey for service provided by the franchise on the display unit of the sign pad (S17), and counts an output time of the selection item screen or image to determine whether about 5 seconds have elapsed (S18). When 5 seconds have lapsed, the franchise client 100 directly proceeds to step S23, in which the sign pad is automatically switched to a digital signature screen.

Subsequently, the franchise client 100 determines whether the customer responds to the survey (S19). When the customer responds to the survey, the customer information server 400 analyzes and statistically processes response data according to the selection items for the satisfaction survey for the service provided by the franchise, and stores the resultant response data in the database 420 (S20). When the customer does not respond to the survey during a certain period of time, the franchise client 100 directly proceeds to step S23, in which the sign pad is automatically switched to a screen for obtaining a digital signature.

The customer information server 400 then calculates and creates customer satisfaction evaluation information based on the satisfaction response data from the customer, gives an incentive or a penalty to the franchise (S21), and transmits the calculated customer satisfaction evaluation information to the franchise client 100 in real time to display the customer satisfaction evaluation information (S22).

The franchise client 100 then switches the display unit of the sign pad 110 to the screen for obtaining a digital signature (S23), and obtains a digital signature from the customer to complete the payment (S24).

Here, the incentive or the penalty is given to the franchise according to a policy of the head office. The incentive such as franchise point save, return support, gift certificate provision, or free new-product shipment may be given to a good franchise, and the penalty such as participation in periodic education performed by the head office, order restriction during a certain period of time, or return restriction may be given to a bad franchise.

An additional point may be saved or a coupon through various events can be provided for a customer responding to the survey. In addition, this fact may be displayed on the sign pad 110 during a predetermined time (about 3 seconds) so that the customer can immediately confirm, on site, whether an additional point is saved or the customer wins the event.

Meanwhile, when the customer selects and requests point save in step S12, the franchise client 100 calculates a point as a predetermined percentage of the estimated payment amount, and saves and stores the calculated point in the member information of the customer in the customer information server 400 (S25).

The employee or the cashier then inputs credit-card payment information for the estimated payment amount to the franchise client 100, which requests the card company for credit-card payment information inquiry and payment approval via the VAN company server 200, and receives approval information, as described above (S15).

Thus, the head office can exactly and naturally survey and analyze customer satisfaction or complaints for the franchise providing goods or service via the sign pad in a credit-card payment process, such that the head office can develop new goods or perform marketing, positively cope with the customer complaints, and advantageously and thoroughly manage franchises. The franchise can receive and use all items of information including customer complaints and satisfaction to provide high-quality service.

FIG. 7 is a flowchart illustrating another example of a method of managing franchises using a credit-card payment system according to the first exemplary embodiment of the present invention, in which a customer neither provides a membership card nor indicates a member registration number, a resident registration number, or a telephone number.

Referring to FIG. 7, when a customer selects goods and/or uses service and then requests payment, an employee or a cashier in a franchise inputs a use statement of the goods or service to the franchise client 100 (S30).

The franchise client 100 then receives credit-card payment information and requests a card company for credit-card payment information inquiry and payment approval via the VAN company server 200 (S31).

The franchise client 100 then receives payment approval from the credit-card company server 300 via the VAN company server 200 (S32).

The franchise client 100 then outputs a selection item screen or image for a satisfaction survey for service provided by the franchise on the display unit of the sign pad (S33), and counts an output time of the selection item screen or image to determine whether about 5 seconds have elapsed (S34). When 5 seconds have elapsed, the franchise client 100 directly proceeds to step S39, in which the sign pad is automatically switched to the screen for obtaining a digital signature.

Subsequently, the franchise client 100 determines whether the customer responds to the survey (S35). When the customer responds to the survey, the franchise client 100 stores response data in the database 420 of the customer information server according to the selection items for the satisfaction survey for the service provided by the franchise (S36). On the other hand, when the customer does not respond to the survey during a certain period of time, the franchise client 100 directly proceeds to step S39, in which the sign pad is automatically switched to the screen for obtaining a digital signature.

The customer information server 400 then calculates and creates customer satisfaction evaluation information based on the satisfaction response data from the customer, gives an incentive or a penalty to the franchise (S37), and transmits the calculated customer satisfaction evaluation information to the franchise client 100 in real time to display the customer satisfaction evaluation information (S38).

The franchise client 100 then switches the display unit of the sign pad 110 to the screen for obtaining a digital signature (S39), and obtains a digital signature from the customer to complete the payment (S40).

FIG. 8 is a flowchart illustrating a method of managing franchises using a credit-card payment system according to a second exemplary embodiment of the present invention, in which a customer provides a membership card or indicates a member registration number, a resident registration number, or a telephone number, and selects a survey and response through a mobile communication terminal in a payment process through a sign pad.

Referring to FIG. 8, when the customer selects goods and/or uses service and then provides a membership card or indicates member information, such as a member registration number, a resident registration number or a telephone number, an employee or a cashier in the franchise inputs a goods or service use statement to the franchise client 100 to calculate an estimated payment amount, and inputs member information of the customer to the franchise client 100 using, for example, a reader (S50).

The franchise client 100 then transmits the member information, such as the member registration number, the resident registration number, or the telephone number input or obtained by reading the membership card to the customer information server 400 of the head office to request member information inquiry and member authentication. The customer information server 400 compares a member authentication request signal for the customer with previously stored member information of the customer to perform authentication processing and transmits the result of authentication processing to the franchise client 100 (S51).

When the customer information server 400 authenticates the member, the franchise client 100 calculates a point as a predetermined percentage of the estimated payment amount (S52).

The franchise client 100 then confirms whether there is an available point from the member information of the customer, and determines whether the customer desires to use the available point for payment (S53).

When it is determined that the customer selects and requests point use, the franchise client 100 confirms a discountable amount of the estimated payment amount from the customer information server 400, which deducts a point corresponding to the discountable amount from the saved point in the member information of the customer, transmits a payment statement including a deduction statement to the franchise client 100, and stores the payment statement in the database 420 of the customer information server 400 (S54). On the other hand, when there is no available point in the member information of the customer, the customer information server 400 transmits a message indicating that a discount benefit is unavailable, to the franchise client 100, and saves a new point (S67).

The franchise client 100 then subtracts an amount corresponding to the deducted point from the estimated payment amount to re-calculate an estimated payment amount, receives credit-card payment information, requests the card company for credit-card payment information inquiry and payment approval via the VAN company server 200 (S55), and receives payment approval from the credit-card company server 300 via the VAN company server 200 (S56).

The franchise client 100 then outputs a selection item screen or image for a satisfaction survey for service provided by the franchise on the display unit of the sign pad 100 (S57), and determines whether the customer selects a survey and response through the mobile communication terminal 700 (S58). In this case, when there is no response from the customer during a certain period of time, the franchise client 100 directly proceeds to step S65, in which the sign pad is automatically switched to the screen for obtaining a digital signature.

When it is determined in step S58 that the customer selects the survey and response through the mobile communication terminal 700, survey data is transmitted to the mobile communication terminal 700 of the customer through telecommunication company service (S59).

A determination is then made as to whether the customer responds to the survey through the mobile communication terminal 700 (S60). When the customer responds to the survey, the telecommunication company server 600 receives response data from the customer and transmits the response data to the customer information server 400 (S61).

The customer information server 400 analyzes and statistically processes the response data according to selection items for service satisfaction survey and stores the resultant response data in the database 420 of the customer information server (S62). On the other hand, when the customer does not respond to the survey during a certain period of time, the franchise client 100 directly proceeds to step S65, in which the sign pad is automatically switched to the screen for obtaining a digital signature.

The customer information server 400 subsequently calculates and creates customer satisfaction evaluation information based on the response data for satisfaction from the customer, gives an incentive or a penalty to the franchise (S63), and transmits the customer satisfaction evaluation information to the franchise client 100 in real time to display the customer satisfaction evaluation information (S64).

The franchise client 100 then switches the display unit of the sign pad 110 to a screen for obtaining a digital signature (S65) and obtains the digital signature from the customer to complete the payment (S66).

Here, the incentive or the penalty is given to the franchise according to a policy of the head office. The incentive such as franchise point save, return support, gift certificate provision, or free new-product shipment may be given to a good franchise, and the penalty such as participation in periodic education performed by the head office, order restriction during a certain period of time, or return restriction may be given to a bad franchise.

An additional point may be saved or a coupon through various events can be provided for a customer responding to the survey. In addition, this fact may be displayed on the sign pad 110 during a predetermined time (about 3 seconds) so that the customer can immediately confirm, on site, whether an additional point is saved or the customer wins the event.

Meanwhile, when the customer selects and requests point save in step S53, the franchise client 100 calculates a point as a predetermined percentage of the estimated payment amount, and saves and stores the calculated point in the member information of the customer in the customer information server 400 (S67).

The employee or the cashier then inputs credit-card payment information for the estimated payment amount to the franchise client 100, which requests the card company for credit-card payment information inquiry and payment approval via the VAN company server 200, and receives approval information, as described above (S55).

According to the present invention, customer's opinions including satisfaction or complaints related to a franchise providing goods or service, frequently generated at the franchise, are provided in a rating-specific survey form through the sign pad or the mobile communication terminal in a credit-card payment process, and a response from the customer is simply and directly received on site and converted into data, such that customer service satisfaction for the franchise can be objectively and exactly surveyed and analyzed and the head office can utilize the data as management guidance data to further enhance specialized service by giving various business-related special treatments, incentives, supports or penalties to the franchises. In addition, customer management can be performed through rapid follow-up measures, such as notification of a process of handling customer complaints and the result of processing, and a custom marketing strategy for resolving a problem with the franchise can be established.

Also, reliability and accuracy of the survey can be secured through a member authentication process performed on customers as survey objects, high effectiveness of expost facto measures to urge the franchise for proper action and correction can be achieved by transmitting and displaying the result of satisfaction evaluation to a franchise client in real time, and customers can be motivated and induced for participation by rewarding the customers for a survey response.

Furthermore, since customer's desire can be individually satisfied using evaluation information from the customer, reliability between the franchise and the customer can be enhanced and a strong relationship can be established therebetween, such that purchasing power of customers can be increased and new customers can be secured due to propagation of brands and products through oral tradition. Thus, the franchise can expect high profitability due to increase of sales.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of managing franchises for evaluating a franchise based on customer satisfaction survey information over a network for individual franchise accounts, comprising, using a credit-card payment system, comprising:
   providing at least one survey on a customer information server computer system of a head office;
   providing a plurality of sets of survey elements stored on the customer information server computer system for selection for said at least one survey;
   inputting a goods or services use statement at a franchise to a franchise client computer terminal, transmitting the goods or services use statement to the customer information server computer system and storing the goods or services use statement on the customer information computer system;
   associating an individual franchise account to the at least one survey and selecting at least one set of survey elements on the customer information server computer system, said set of survey elements selected based on the goods or services use statement;
   outputting the survey as survey selection items for customer service satisfaction for the franchise through a sign pad connected to the franchise client computer terminal for response to the survey by a customer;
   obtaining customer response data for the survey selection items received from the sign pad at the customer information server computer system, the customer information server computer system analyzing and statistically processing the customer response data for the franchise according to the survey selection items, storing resultant customer satisfaction evaluation information in a database of the customer information server computer system, the customer information server computer system converting the customer satisfaction evaluation information into a numerical value, and the customer information server computer system transmitting the numerical value to the franchise client computer terminal via the network to display the numerical value in real time;
   calculating an evaluation rating on the customer information server computer system for the franchise based on the customer satisfaction evaluation information, and the customer information server computer system giving a penalty to the franchise based on the evaluation rating if the evaluation rating is low, wherein the penalty comprises one or more of a participation in periodic education performed by the head office, an order restriction during a certain period of time, a return restriction, or a return restriction during a certain period of time; and
   switching the sign pad automatically to a screen for obtaining a digital signature from the customer.

2. The method according to claim 1, further comprising inputting member information of the customer to the franchise client terminal, and transmitting the member information to the customer information server of the head office via the network to request member authentication,
   selecting ones of said survey element sets to generate said survey, selected based on an event, a season, or other elements for the customer who is an authenticated member when a predetermined period has lapsed since this particular customer's identification information has been encountered.

3. The method according to claim 1, further comprising inputting member information of the customer to the franchise client terminal, and transmitting the member information to the customer information server of the head office via the network to request member authentication;
   receiving, by the customer information server, a member authentication request signal for the customer, comparing the member authentication request signal with previously stored member information of the customer to perform authentication processing, and transmitting the result of authentication processing to the franchise client terminal via the network;
   calculating, by the franchise client terminal, a point in a predetermination ratio of an estimated payment amount, and saving and storing the point in the member information of the customer in the customer information server via the network.

4. The method according to claim 1, further comprising inputting member information of the customer to the franchise client terminal, and transmitting the member information to the customer information server of the head office via a network to request member authentication;
   receiving, by the customer information server, a member authentication request signal for the customer, comparing the member authentication request signal with previously stored member information of the customer to perform authentication processing, and transmitting the result of authentication processing to the franchise client terminal via the network;
   determining whether the customer wins an event and displaying an indication of whether the customer wins the event on the sign pad during a certain period of time.

5. The method according to claim 1, further comprising providing an incentive to the franchise if the evaluation rating is high, wherein the incentive comprises one or more of a franchise point save, a return support, a gift certificate provision, or a free new-product shipment.

6. The method according to claim 1, further comprising determining member information of the customer, wherein if the customer is not a member, restricting the use of the survey information in rating the franchise.

7. The method according to claim 1, further comprising determining member information of the customer, wherein if the customer is not a member, inducing the customer to become a member.

8. The method according to claim 1 further inputting credit-card payment information for the goods or services use statement of the customer at the franchise to the franchise client terminal, requesting a card company for payment approval, and receiving approval information via the network before said step of outputting the survey as survey selection items for customer satisfaction.

9. A franchise evaluation system for evaluating a franchise based on customer satisfaction survey information over a credit card payment network for an individual franchise account, comprising:
   a local franchise client computer generating network access requests for said individual franchise account;
   a sign pad connected to the local franchise client computer;
   a remote customer information server computer system; at least one survey stored on said customer information server computer system;
   a plurality of sets of survey elements stored on said customer information server computer system for selection for construction of said at least one survey;

said remote customer information server computer system further receiving said network access requests from said franchise client computer and preparing and executing said at least one survey utilizing by selection one or more of said sets of survey elements and providing said survey to said local franchise client computer for completion by a customer via the sign pad connected to the local franchise client computer;

said remote customer information server computer system analyzing and statistically processing the completed survey, said remote customer information server computer system storing resultant customer satisfaction evaluation information in a database of the customer information server computer system, said remote customer information server computer system converting the customer satisfaction evaluation information into a numerical value, and said remote customer information server computer system transmitting the numerical value to the local franchise client computer via the network to display the numerical value in real time; and said remote customer information server computer system calculating an evaluation rating for the franchise based on the customer satisfaction evaluation information, and said remote customer information server computer system giving a penalty to the franchise based on the evaluation rating if the franchise is a bad franchise (a franchise with an evaluation rating of low) wherein the penalty comprises one or more of a participation in periodic education performed by the head office, an order restriction during a certain period of time, a return restriction, or a return restriction during a certain period of time, wherein said remote customer information server computer system provides said survey to said local franchise client computer for completion by the customer via the sign pad connected to the local franchise client computer.

10. The franchise evaluation system according to claim 9, wherein said franchise client computer further receives input member information of the customer, and transmits the member information to the customer information server via the network to request member authentication, said customer information server selects said survey elements sets based on an event, a season, or other elements for the customer who is an authenticated member when a predetermined period has lapsed since this particular customer's identification information has been encountered.

11. The franchise evaluation system according to claim 9, wherein said franchise client computer further receives input member information of the customer, and transmits the member information to the customer information server via the network to request member authentication, the customer information server receives a member authentication request signal for the customer and compares the member authentication request signal with previously stored member information of the customer to perform authentication processing, and transmits the result of authentication processing to the franchise client terminal via the network;

the franchise client terminal calculates a point in a pre-determination ratio of an estimated payment amount and transmits the point to the customer information server; and the customer information server stores the point in the member information of the customer in the customer information server.

12. The franchise evaluation system according to claim 9, wherein said franchise client computer further receives input member information of the customer, and transmits the member information to the customer information server via the network to request member authentication, the customer information server receives a member authentication request signal for the customer and compares the member authentication request signal with previously stored member information of the customer to perform authentication processing, and transmits the result of authentication processing to the franchise client terminal via the network;

the customer information server determines whether the customer wins an event and displays an indication of whether the customer wins the event on the sign pad during a certain period of time.

13. The franchise evaluation system according to claim 9, further comprising providing an incentive to the franchise if the franchise is a good franchise (a franchise with an evaluation rating of high), wherein the incentive comprises one or more of a franchise point save, a return support, a gift certificate provision, or a free new-product shipment, provided to a good franchise (a franchise with an evaluation rating of high).

14. The franchise evaluation system according to claim 9, wherein said customer information server further determines member authentication of the customer, wherein if the customer is not a member, the customer information server restricts the use of the survey information in rating the franchise.

15. The franchise evaluation system according to claim 9, wherein said customer information server further determines member authentication of the customer, wherein if the customer is not a member, the customer information server induces the customer to become a member.

16. The franchise evaluation system according to claim 9, wherein said franchise client terminal further inputs credit-card payment information for a goods selection or service use of a nonmember customer at the franchise, requests a card company for payment approval, and receives approval information via the network before providing said survey.

17. The method according to claim 1, wherein the franchise is a food industry franchise.

18. The franchise evaluation system according to claim 9, wherein the franchise is a food industry franchise.

19. The method according to claim 1, wherein said analyzing and statistically processing the customer response data comprises performing classification according to a region, the franchise, and a sex and age of customers on the whole or based on a unique number for statistical calculation.

20. The method according to claim 9, wherein said analyzing and statistically processing the customer response data comprises performing classification according to a region, the franchise, and a sex and age of customers on the whole or based on a unique number for statistical calculation.

* * * * *